United States Patent [19]
Olivera

[11] Patent Number: 4,528,947
[45] Date of Patent: Jul. 16, 1985

[54] SOLAR OXY-HYDROGEN VEHICLE

[75] Inventor: Wallace Olivera, Enfield, Conn.

[73] Assignee: Uni-Energy Systems, Inc., Hartford, Conn.

[21] Appl. No.: 551,865

[22] Filed: Nov. 15, 1983

Related U.S. Application Data

[63] Continuation-in-part of Ser. No. 319,042, Mar. 10, 1982, abandoned.

[51] Int. Cl.³ .............................................. F02B 43/00
[52] U.S. Cl. .................. 123/3; 123/DIG. 12; 204/DIG. 4
[58] Field of Search .................. 123/1 A, 3, DIG. 12; 180/65.1, 65.3; 204/129, DIG. 4

[56] References Cited

U.S. PATENT DOCUMENTS

| | | | |
|---|---|---|---|
| 4,141,425 | 2/1979 | Treat | 180/65.3 |
| 4,246,080 | 1/1981 | Shinn | 123/3 |
| 4,271,793 | 6/1981 | Valdespino | 123/3 |
| 4,302,217 | 11/1981 | Teitel | 123/3 |

Primary Examiner—William A. Cuchlinski, Jr.
Attorney, Agent, or Firm—McCormick, Paulding & Huber

[57] ABSTRACT

An electrolysis unit for producing hydrogen and oxygen gases is formed by the cooling system of an internal combustion engine wherein the engine casing forms one of the electrodes and produces one of the hydrogen and oxygen gases and the radiator forms the other of the electrodes and produces the other of the gases. The electrolyte used in the electrolysis unit includes a hydride for absorbing and storing hydrogen produced by the electrolysis process and for releasing hydrogen when thermally activated. An array of solar cells is integrated into the body panels of the vehicle wherein the engine is located and is connected to the engine and radiator for supplying current to the electrolysis unit for producing the hydrogen and oxygen gases.

10 Claims, 4 Drawing Figures

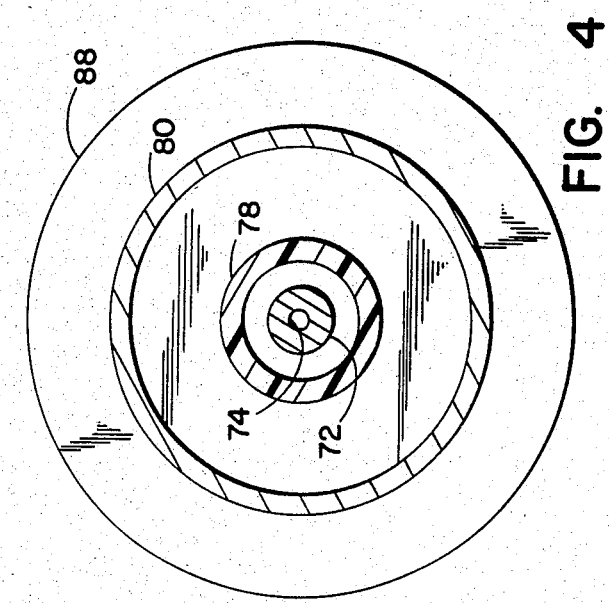

SOLAR OXY-HYDROGEN VEHICLE

CROSS REFERENCE TO RELATED APPLICATIONS

This application is a C.I.P. of my application Ser. No. 319,042, filed Mar. 10, 1982 and entitled SOLAR OXY-HYDROGEN VEHICLE now abandoned.

BACKGROUND OF THE INVENTION

The present invention relates to vehicles of the type having a fuel burning engine, such as an internal combustion engine, in which the combustion process is improved through a solar-powered electrolysis unit that supplements the fuel and air mixture with hydrogen gas.

It is well known in the art to use hydrogen gas to facilitate the combustion of fuels in a fuel burner such as an internal combustion engine. However, certain of the drawbacks and limitations present in many previous approaches for generating and using hydrogen gas are overcome by the present invention.

U.S. Pat. No. 1,379,077, issued May 24, 1921 to Blumenberg, shows the generation of hydrogen and oxygen gases using an electrolysis unit in an automobile. The hydrogen and oxygen gases produced are passed through heavy hydrocarbon fuels where the fuel is physically and chemically modified by the hydrogen. The excess hydrogen gas is fed to a carburetor along with the modified fuel to enhance the fuel-air mixture to allow combustion of the hydrocarbon fuel. However, Blumenberg does not provide storage for any excessively produced hydrogen.

U.S. Pat. No. 4,302,217, issued Nov. 24, 1981 to Teitel, shows a system using a metal hydride to supply hydrogen gas when heated and a microcavity hydrogen storage supply to provide hydrogen gas to regenerate the metal hydride hydrogen supply when the metal hydride is depleted of hydrogen. In addition, the microcavity hydrogen storage supply requires periodic replacement with a freshly charged microcavity hydrogen component. Thermal controls are used to control the heating and cooling of the microcavity storage supply and the metal hydride to regulate the rate of discharge of hydrogen.

U.S. Pat. No. 4,271,793, issued June 9, 1981 to Valdespino, describes an internal combustion engine in which the fuel-air mixture is supplemented by the hydrogen and oxygen gases from an electrolysis unit. The unit is energized by the electrical generating system driven by the engine and the unit is only operative when the engine is running. Large amounts of current are required to produce the preferred amount of hydrogen and oxygen gases and consequently, the unit must be cooled by the engine coolant to dissipate the large amounts of heat generated to prevent electrolyte boil-off. The unit is also further pressurized to minimize boil-off.

The present invention provides an improved oxy-hydrogen fuel burning vehicle in which the electrolysis unit is aided by solar cells to generate supplemental gases that are stored while the vehicle is not in use. Another feature of the present invention eliminates the need for a conventional cooling system associated with the fuel burning engine because heat generated by the combustion and electrolysis processes is absorbed by the electrolyte to enhance the formation of hydrogen and oxygen gases. Still another feature of the invention is the design of the electrolysis unit which minimizes heat generated during electrolysis.

Additional features and advantages of the present invention will become apparent from the following written description and the drawings forming a part thereof.

SUMMARY OF THE INVENTION

The present invention resides in a solar oxy-hydrogen vehicle comprising in combination an internal combustion engine including a fuel system delivering fuel and air for the combustion process wherein an electrolysis unit produces hydrogen and oxygen gases from an electrolyte and the electrolysis unit is connected through conduit means to the fuel system and feeds the gases produced into the engine for combustion with the fuel and air. An array of solar cells produces electrical current from light and the solar cells are connected with the electrolysis unit for sending current through the unit and producing the hydrogen and oxygen gases fed to the fuel system. The invention further resides in the electrolyte used wherein the electrolyte includes a hydride for absorbing and storing hydrogen generated by the electrolysis process and for absorbing heat produced by combustion when the engine is in operation to promote the disassociation of hydrogen stored in the hydride. The invention further resides in the electrolysis unit comprising the engine casing and the cooling system radiator wherein the radiator and engine casing are connected by electrically insulating fluid carrying conduits and the cooling fluid is the electrolyte. The engine casing forms one of the electrodes and produces one of the hydrogen and oxygen gases and the radiator forms the other of the electrodes and produces the other of the gases.

BRIEF DESCRIPTION OF THE DRAWINGS

FIG. 4 is a top plan view in cross-sectional along the line 4—4 of FIG. 3.

DETAILED DESCRIPTION

Figure 1:
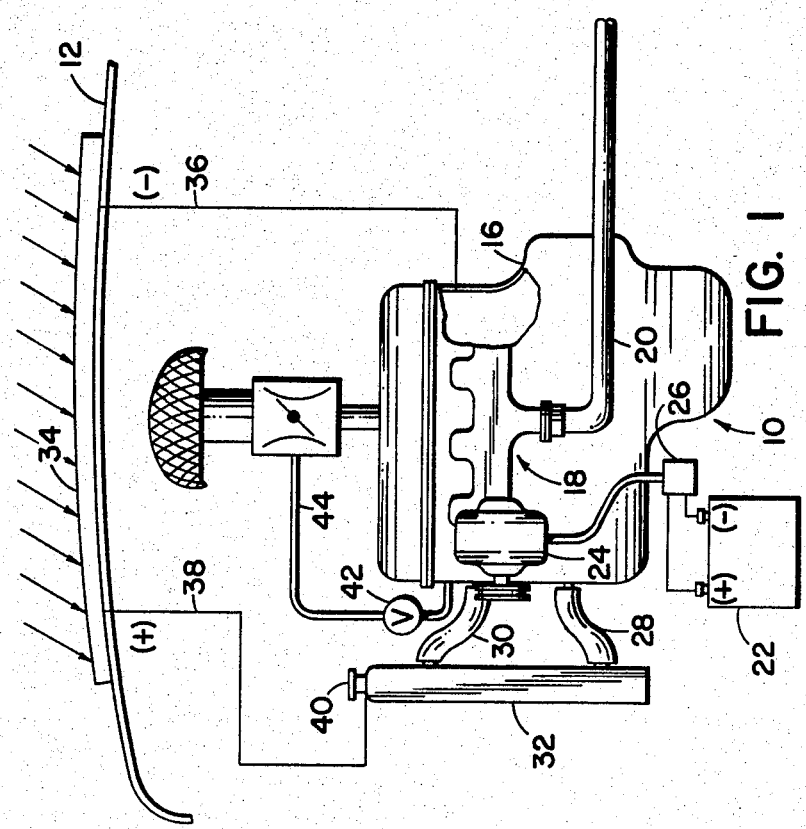
FIG. 1 illustrates the solar oxy-hydrogen fuel burning engine of the present invention embodied in an internal combustion engine of a vehicle.

First by way of background and referring to FIG. 1, FIG. 1 illustrates an internal combustion engine shown generally by the numeral 10 that is mounted within an engine compartment of a vehicle below an overlying body panel 12. The engine 10 is conventional to the extent that is has a carburetor 14 for producing a mixture of fuel and air that is injested into the cylinders within the engine casing 16 where the mixture is burned to produce power. Exhaust gases from the combustion process are discharged through an exhaust system 18 including an exhaust pipe 20. The electrical system providing power for the engine and assessories includes a battery 22, a generator or altenator 24 driven from the engine, and a regulator and control unit 26 to operate and maintain the electrical charge in the battery. The engine casing 16 or block includes a jacket surrounding the cylinders and the jacket is connected through conduits 28, 30 with a cooling means such as a radiator 32.

All of the above components of the engine 10 are conventional parts of the power plants found in most trucks and automobiles as shown, for example, in U.S. Pat. No. 4,271,793 referenced above.

A radiant energy collecting system comprised by a plurality of solar cells 34 is mounted with the cells in an array on the body panel 12 to collect light and solar energy and generate direct current. The solar cells are enclosed in a sealed panel, such as a crystal sheet from which electrons are easily disassociated. The cells are interconnected to produce a voltage of approximately 2 volts between a negative output terminal 36 and a positive output terminal 38. The amperage between the two terminals when a load is connected is proportional to the number of panels. The solar cells are utilized to provide power for an electrolysis unit that generates hydrogen and oxygen gases.

Considering now the invention and still referring to FIG. 1, the electrolysis unit for producing hydrogen and oxygen gases comprises the engine casing 16 and the engine cooling system or radiator 32. An electrode, for example, the negative electrode of the electrolysis unit is formed by the engine casing 16 and is connected to the negative terminal 36 of the solar cells 34. The other electrode, the positive electrode of the unit, is formed by the radiator 32 which is of a noble metal to withstand corrosion and is correspondingly connected to the positive terminal 38 of the solar cells 34. The engine coolant itself is replaced by an electrolyte and electrically insulating fluid conduits such as rubber hoses 28,30 connect the radiator 32 to the jacket surrounding the cylinders in engine casing 16. The electrolyte provides an electrical current path between the positive and negative electrodes. During electrolysis, oxygen ions flow to the positive electrode and form an oxygen gas in the radiator 32, and the oxygen is bled through a valve 40 on the radiator 32 to the atmosphere. Hydrogen ions flow to the negative electrode and form hydrogen gas in the engine casing 16. The hydrogen gas is collected within the upper portion of the casing 16 which is connected by a valve 42 and a conduit 44 connecting the valve 42 to the carburetor 14 to provide hydrogen gas to the carburetor 14.

The electrolyte used with the present invention includes a hydride for absorbing and storing hydrogen generated by the current produced by the solar cells 34 when the engine is not in operation and consuming hydrogen gas fed to the carburetor 14. The hydride also absorbs heat produced by the combustion process when the engine is in operation to promote the disassociation of hydrogen stored in the hydride. Consequently, since the heat of combustion is absorbed by the hydride, a conventional cooling system is not necessary. Therefore, the water pump and conventional radiator associated with the cooling system can be eliminated and the radiator 32 is replaced with a reservoir means to hold a supply of electrolyte and to function as one of the electrodes. The hydride in the electrolyte also functions as a reserve source of hydrogen to supplement the hydrogen produced by electrolysis when the engine is in operation and consuming the hydrogen gas produced. The hydride is thermally activated, that is, hydrogen is more easily disassociated from the hydride when heat is added. Preferably, the hydride has an optimum hydrogen disassociation at a temperature of approximately 150° Fahrenheit to permit heat to be absorbed by the hydride to produce a sufficient quantity of hydrogen and still remain well below the boiling point of most electrolytes such as water. Consequently, since the heat is absorbed by the hydride the electrolyte will not boil-off during electrolysis and cooling of the electrolysis unit and accordingly the electrolyte is not required.

The hydride used in the electrolyte of the present invention is formed in the following manner. The hydride is produced from a reaction involving the dissolving of titanium in a sulfuric acid solution having a concentration in the range of 7 to 38%. A platinum electrode is used as the anode and a titanium electrode is used as the cathode with the titanium electrode providing the titanium for the solution. An electrical current is supplied at 12 volts to start the reaction and once the reaction is started it is self-sustaining and electrical current is no longer needed. The titanium dissolves in the sulfuric acid solution until saturation occurs, at which time the titanium-sulfate solution becomes black. An organic hydrocarbon compound, such as isopropyl alcohol having a 70% concentration, is added to the black solution in the proportion one part alcohol to five parts of the titanium-sulfate solution. A second voltage of approximately 2 volts is then applied across the anode and cathode to start electrolysis to produce hydrogen which is absorbed by the titanium-sulfate solution and causes a white precipitate to form and to turn the black titanium-sulfate solution clear. The titanium, carbon and hydrogen ions are now bonded together in the white precipitate which is the hydride. When the hydride is used in the electrolyte and is heated above 150° Farenheit, hydrogen is expelled and the solution begins to turn black again. The solar cells 34 generate a voltage of approximately 2 volts in magnitude and the electrical current produced is used to repeat the electrolysis process to continuously replenish the hydride with hydrogen. Therefore, the hydride may be regenerated without the necessity of a prolonged fuel stop.

Figure 2:
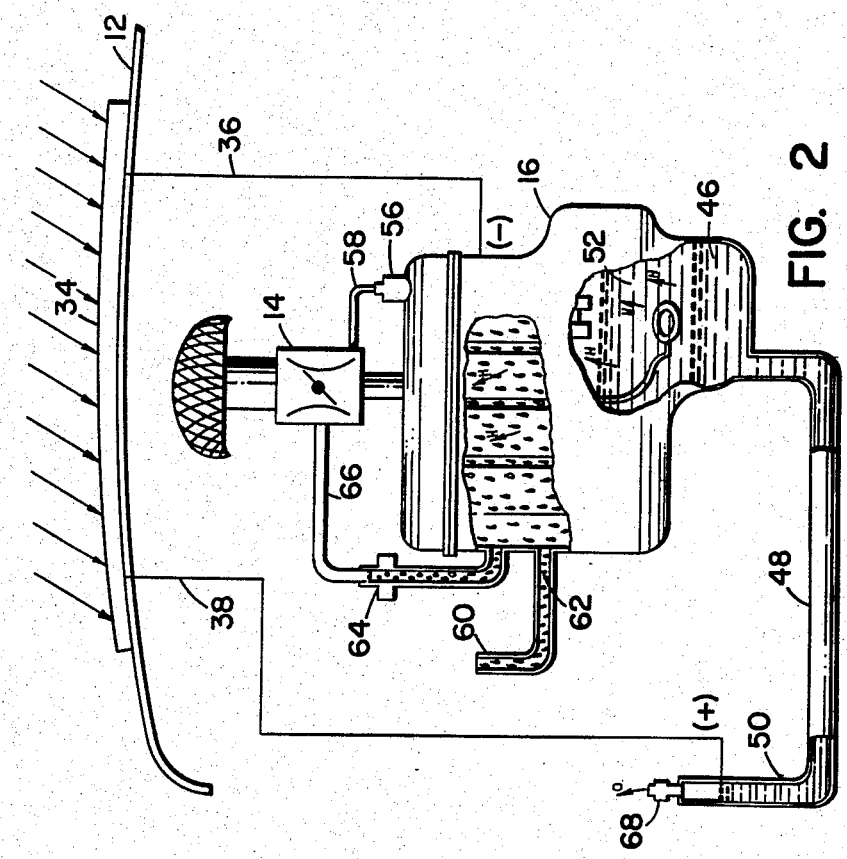
FIG. 2 illustrates another embodiment of the invention in an internal combustion engine.

FIG. 2 shows another embodiment of the present invention in an internal combustion engine wherein the electrolyte 46 is contained in the oil pan of the engine casing 16 and the casing is connected by an electrically insulating conduit 48 to a reservoir means 50. The engine casing 16 and reservoir means 50 form an electrolysis unit with the engine casing being the negative electrode and the reservoir means being the positive electrode. An array of solar cells 34 is mounted on a body panel 12 for producing electrical current from sunlight to power the electrolysis unit. The positive terminal of the solar cells 34 is connected via lead 38 to the reservoir means 50 which functions as an anode and the negative terminal of the solar cells is connected via lead 36 to the engine casing 16 which functions as the cathode. The electrolyte includes a hydride as described above for absorbing and storing hydrogen generated by the electrolysis process. The hydrogen produced by electrolysis and the hydrogen released from the hydride when the hydride is heated bubbles through the engine oil into the upper portion of the engine casing 16 where the hydrogen gas collects and is fed through a positive ventilation crankcase (PVC) valve 56 which is connected to the carburetor 14 by conduit 58. The oxygen gas generated during the electrolysis process is vented to the atmosphere through a vent 68 connected to the reservoir means 50.

Because the hydride absorbs the heat of combustion and the engine may be operated without a conventional cooling system it is possible to feed the fuel used in the fuel-air mixture through the jacket surrounding the cylinders in the engine casing 16 through an inlet 60.

Hydrogen released from the hydride and produced by electrolysis is also bubbled through the engine fuel 62 flowing through the jacket where the fuel absorbs the hydrogen and becomes more volatile. The fuel 62 is fed through a valve 64 to the carburetor 14 via a conduit 66.

Figure 3:
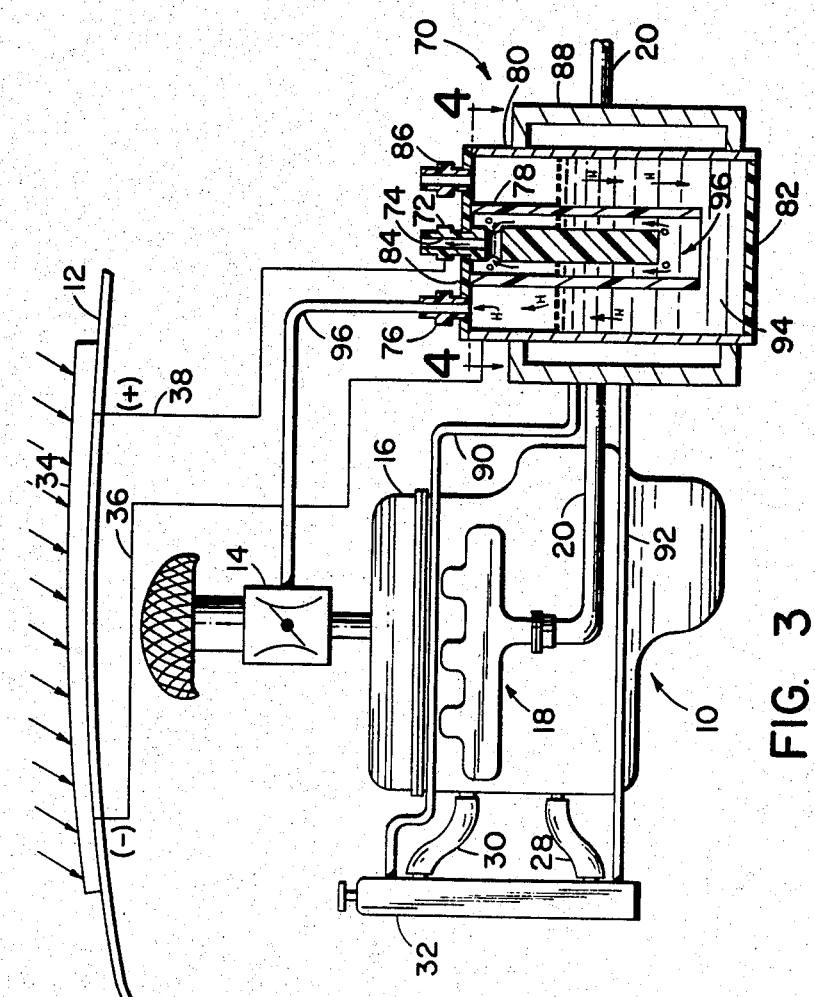
FIG. 3 illustrates a third embodiment of the invention showing a cross-sectional view of an electrolysis unit that may be used to produce hydrogen and oxygen gases.

Turning now to FIGS. 3 and 4, an electrolysis unit also known as an electrolytic cell for producing hydrogen and oxygen gases for use with a fuel burning engine such as an internal combustion engine is shown generally by the numeral 70. An internal combustion engine is shown generally by the numeral 10 and is similar to the engine described in the above referenced patent. The electrolysis unit 70 is preferably cylindrical in shape having walls 80 which form one of the electrodes, that electrode being the cathode and producing hydrogen gas and the second electrode 72 being the anode and producing the oxygen gas. A source of electrical current such as solar cells 34 mounted on a body panel 12 provide current to the electrolysis unit 70. The anode 72 is connected to the positive terminal of the solar cells 34 by lead 38. The cathode 80 is connected to the negative terminal of the solar cells 34 by lead 36. The solar cells are connected in such a manner to produce a voltage of not more than 2 volts across the positive and negative terminals 36,38. Limiting the magnitude of the voltage used for electrolysis automatically limits the amount of current that can flow in the electrolysis unit 70 and accordingly any heat generated by the electrolysis process.

As is shown in FIGS. 3 and 4, the anode 72 extends into the electrolytic cell 70 through a lid 84 and the anode 72 is substantially coaxial with the cylinder wall 80. A bottom 82 and the lid 84 are fabricated from a non-conductive, non-corrosive material such as plastic to withstand corrosion and prevent current from flowing in a path other than that provided by the electrolyte.

A sleeve 78 is also fabricated from a non-conductive, non-corrosive material such as plastic and attaches to the lid 84 and surrounds the anode 72. The sleeve 78 extends into the electrolytic cell further than the anode 72, so that ion flow in the electrolyte 94 flows to the cathode 80 from the anode 72 through an aperture shown generally at 96 formed at the end of the sleeve 78 opposite the end attached to the lid 84. A relatively smaller ionic discharge area from the anode 72 to a much larger ionic receptive area such as the cathode 80 also minimizes heat generated in the electrolysis process and prevents electrolyte boiloff in the electrolytic cell without the need of external cooling.

Venting means 74 in the anode 72 allow the generated oxygen gases to escape to the atmosphere. A vent 76 in the lid 84 is connected by a conduit 96 to the carburetor 14 to deliver hydrogen gas formed and collected at the cathode 80. An inlet valve 86 is provided in the lid 84 for filling the electrolytic cell 70 with electrolyte 94.

A heat exchanger means 88 surrounds the electrolytic cell 70 and transfers heat to the electrolyte to promote the production of hydrogen. The heat exchanger is connected, for example, to the cooling system 32 and the cooling fluid is circulated through conduits 90,92 attached to the heat exchanger means 88 to transfer heat. Heat generated by the combustion process and expelled as exhaust gas may also be in communication with the heat exchanger means 88 to provide a source of heat to the electrolytic cell 70 to promote the production of hydrogen and oxygen gases.

A solar oxy-hydrogen fuel burning vehicle embodying the present invention has been described and shown in several preferred embodiments; however, numerous modifications and changes may be had without departing from the spirit of the invention. Therefore, the invention has been described by way of illustration rather than limitation.

I claim:

1. A solar oxy-hydrogen vehicle comprising in combination:
   an internal combustion engine including a fuel system delivering fuel and air for the combustion process;
   an electrolyte;
   an electrolysis unit for producing hydrogen and oxygen gases from said electrolyte and connected through conduit means with the fuel system for feeding the gases into the engine for combustion with the fuel and air;
   an array of solar cells for the production of electrical current from light, the solar cells being connected with said electrolysis unit for sending current through the unit and producing the hydrogen and oxygen gases fed to the fuel system, and
   said electrolyte including a hydride comprising titanium dissolved in a 7% to 38% concentrated sulphuric acid solution to form a titanium-sulfate solution which is reacted with an organic hydrocarbon compound whereby said hydride absorbs and stores hydrogen generated by the electrolysis process and absorbs heat produced by combustion when the engine is in operation to promote the disassociation of hydrogen stored in the hydride.

2. A solar oxy-hydrogen vehicle as defined in claim 1 wherein said titanium-sulfate solution is reacted with isopropyl alcohol having a 70% concentration, said alcohol being mixed with said titanium-sulfate solution in the proportion one part alcohol to five parts titanium-sulfate.

3. A solar oxy-hydrogen vehicle as defined in claim 1 wherein said engine includes an engine cooling system having a radiator, electrically insulating fluid carrying conduits and an engine casing jacket, and wherein said electrolysis unit further comprises the engine casing and the cooling system radiator, and the radiator and engine casing are connected by said electrically insulating fluid carrying conduits with the cooling fluid being the electrolyte, the engine casing forming one of the electrodes and producing one of the hydrogen and oxygen gases, the radiator forming the other of the electrodes and producing the other of the gases.

4. A solar oxy-hydrogen vehicle as defined in claim 3 wherein said radiator is constructed of a noble metal.

5. A solar oxy-hydrogen vehicle as defined in claim 1 wherein said electrolysis unit comprises:
   container means having sides, a lid and a bottom for holding a quantity of electrolyte, the lid and bottom being made of a non-corrosive and electrically non-conductive material and the sides forming one of the electrodes for producing one of the hydrogen and oxygen gases;
   second electrode means extending through the lid transversely into said container means for a first predetermined distance for producing the other of the gases;
   means for applying an electrical potential across said first and said second electrode means;
   shielding means surrounding said second electrode means and having one end attached to the container lid and the other end open and extending into said container for a second predetermined distance, said second predetermined distance being greater than said first predetermined distance, said shielding means further having a fixed, spatial relationship with said first and second electrode means to form a first channel between said shielding means and said first electrode and a second channel between said shielding means and said second electrode such that said second channel is smaller than said first channel whereby the ion flow in the electrolyte to said electrodes is limited so that heat produced by electrolysis is controlled to prevent electrolyte boil off, and venting means associated with said first and said second electrode means for allowing the hydrogen and oxygen gases produced during electrolysis to be released from said electrolysis unit.

6. A solar oxy-hydrogen vehicle as defined in claim 5 further including a heat exchanging means associated with said electrolysis unit for transferring heat to said unit to promote the production of hydrogen and oxygen gases produced by electrolysis.

7. A solar oxy-hydrogen vehicle as defined in claim 5 wherein the means for applying an electrical potential across the first and second electrodes has an output voltage not more than two volts to limit the electrical current flowing in the electrolyte so that the heat produced by electrolysis is limited whereby cooling of the electrolysis unit is not required.

8. In a solar oxy-hydrogen vehicle, the combination comprising:
an internal combustion engine including a fuel system delivering fuel and air for combustion, a crankcase, a first conduit means connected to the fuel system and the engine crankcase for delivering gases in the crankcase to the fuel system;
an electrolyte;
electrically insulating conduit means for carrying a liquid;
reservoir means for holding a supply of said electrolyte and connected to the engine crankcase by said insulating conduit means with the electrolyte flowing between the engine crankcase and said reservoir means through said insulating conduit means;
an electrolysis unit for producing hydrogen and oxygen gases from said electrolyte wherein said electrolysis means comprises said reservoir means and the engine crankcase, said reservoir means forming one of the electrodes and producing one of the hydrogen and oxygen gases, the engine crankcase forming the other of the electrodes and producing the other of the gases, and
an array of solar cells integrated into the body panels of the vehicle for the production of electrical current from light, the cells being connected to produce an electrical current at a potential of not more than two volts and also connected with said electrolysis means for energizing said electrolysis means and producing the hydrogen and oxygen gases.

9. In a solar oxy-hydrogen vehicle the combination as defined in claim 8 wherein said electrolyte includes a hydride for absorbing and storing hydrogen produced from the current of the solar cells passing through said electrolysis unit when the engine is not in operation and for capturing the heat of combustion when the engine is in operation to facilitate the release of hydrogen stored in the hydride.

10. In a solar oxy-hydrogen vehicle the combination as defined in claim 8 wherein said first conduit means connecting the engine crankcase and the fuel system is a positive crankcase ventilation valve.

* * * * *